(12) United States Patent
D'Almeida et al.

(10) Patent No.: US 7,298,068 B2
(45) Date of Patent: Nov. 20, 2007

(54) MATERIALS OF ACTIVE-PISTON ACTUATORS

(75) Inventors: Oscar D'Almeida, Boulogne Billancourt (FR); Mathias Woydt, Berlin (DE); Jean-Thierry Audren, Saint Remy les Chevreuses (FR)

(73) Assignee: Sagem Defense Securite, Paris (DE)

( * ) Notice: Subject to any disclaimer, the term of this patent is extended or adjusted under 35 U.S.C. 154(b) by 0 days.

(21) Appl. No.: 11/444,933

(22) Filed: May 31, 2006

(65) Prior Publication Data

US 2007/0114887 A1 May 24, 2007

(30) Foreign Application Priority Data

Jun. 1, 2005 (FR) .................................. 05 05554

(51) Int. Cl.
*H01L 41/00* (2006.01)
*H02N 2/00* (2006.01)
(52) U.S. Cl. .................................................. 310/346
(58) Field of Classification Search ................ 310/311, 310/328, 346
See application file for complete search history.

(56) References Cited

U.S. PATENT DOCUMENTS

| | | | | |
|---|---|---|---|---|
| 3,673,443 | A * | 6/1972 | Siegel | 310/338 |
| 4,958,100 | A * | 9/1990 | Crawley et al. | 310/328 |
| 6,313,568 | B1 | 11/2001 | Sullivan et al. | |
| 6,462,463 | B1 * | 10/2002 | Audren | 310/328 |
| 6,633,108 | B1 * | 10/2003 | Boecking | 310/346 |
| 2001/0021292 | A1 | 9/2001 | Merkel | |
| 2002/0113524 | A1 * | 8/2002 | Hays et al. | 310/346 |
| 2006/0279177 | A1 * | 12/2006 | D'Almeida et al. | 310/348 |

FOREIGN PATENT DOCUMENTS

| | | |
|---|---|---|
| EP | 1348730 | 10/2003 |
| FR | 2790618 | 9/2000 |
| FR | 2800028 | 4/2001 |
| FR | 2819468 | 7/2002 |
| JP | 2003-174207 | * 6/2003 |

OTHER PUBLICATIONS

Wang Kai et al: Mode Gruneisen parameters and negative thermal expansion of cubic ZrW208 and ZrMo208; Applied Phsics Letters, AIP, American Institute of Physics, Melvill, NY, US. vol. 76, No. 16, pp. 2203-2204, Apr. 17, 2000.

* cited by examiner

*Primary Examiner*—Thomas M. Dougherty
(74) *Attorney, Agent, or Firm*—Blakely Sokoloff Taylor & Zafman

(57) ABSTRACT

The invention concerns an actuator that includes an active piston, an inner sliding cylinder and an outer cylinder in which the said sliding cylinder is pre-stressed, where one of the cylinders is in a material with a negative thermal expansion coefficient or one that is close to zero, with the other cylinder having a positive thermal expansion coefficient, in which the material of the cylinder with negative expansion coefficient or one close to zero is one of the following materials:

$\gamma$-$ZrMo_2O_8$ in cubic structure,
$Zr_2W\,P_2O_{12}$,
a silicious faujasite,
$Lu_2(WO_4)_3$,
$ZrW_2O_8$ in cubic phase, with nanograins whose size is approximately between 10 nm and 75 nm, or
any possible combination of these materials.

10 Claims, 5 Drawing Sheets

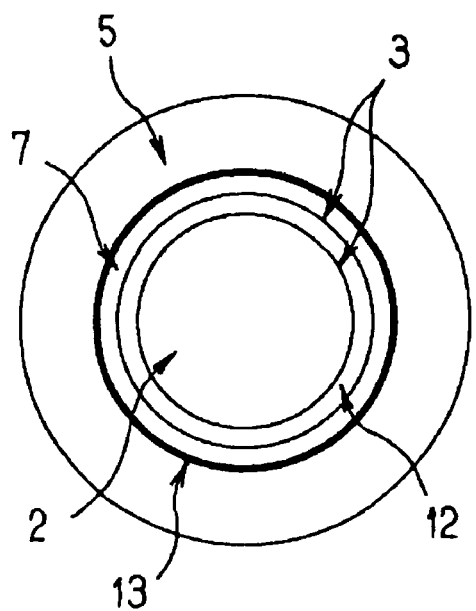
FIG_3
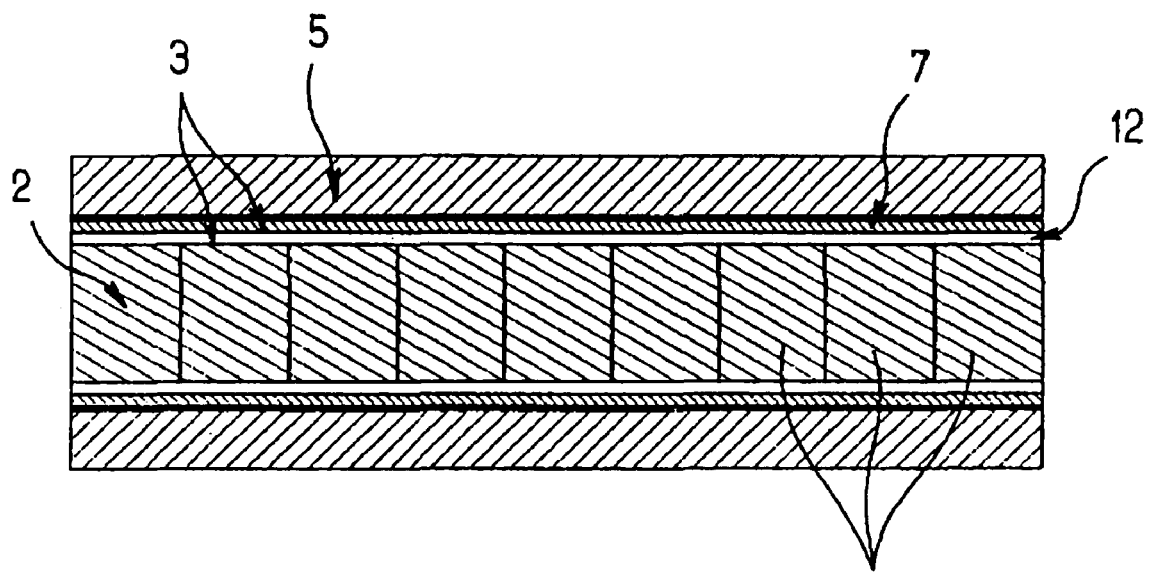
FIG_4

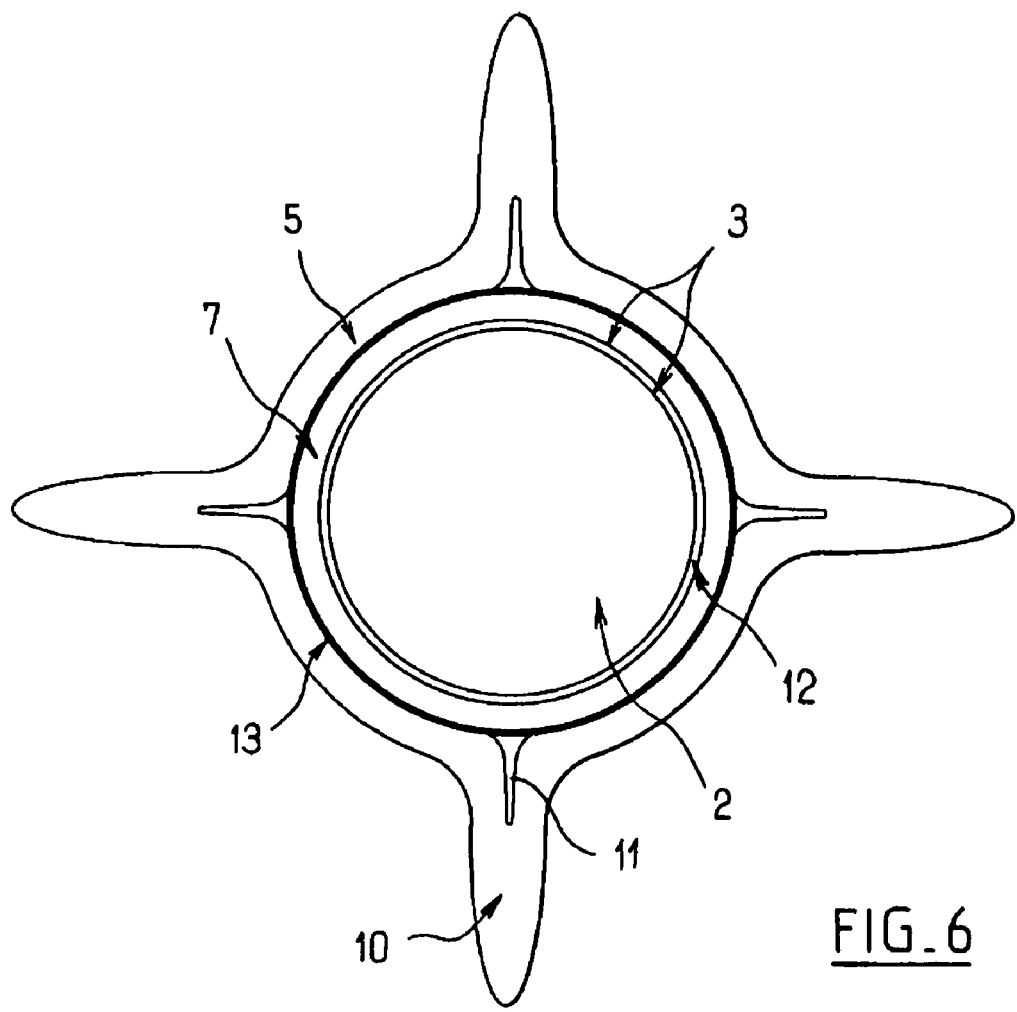
FIG._6
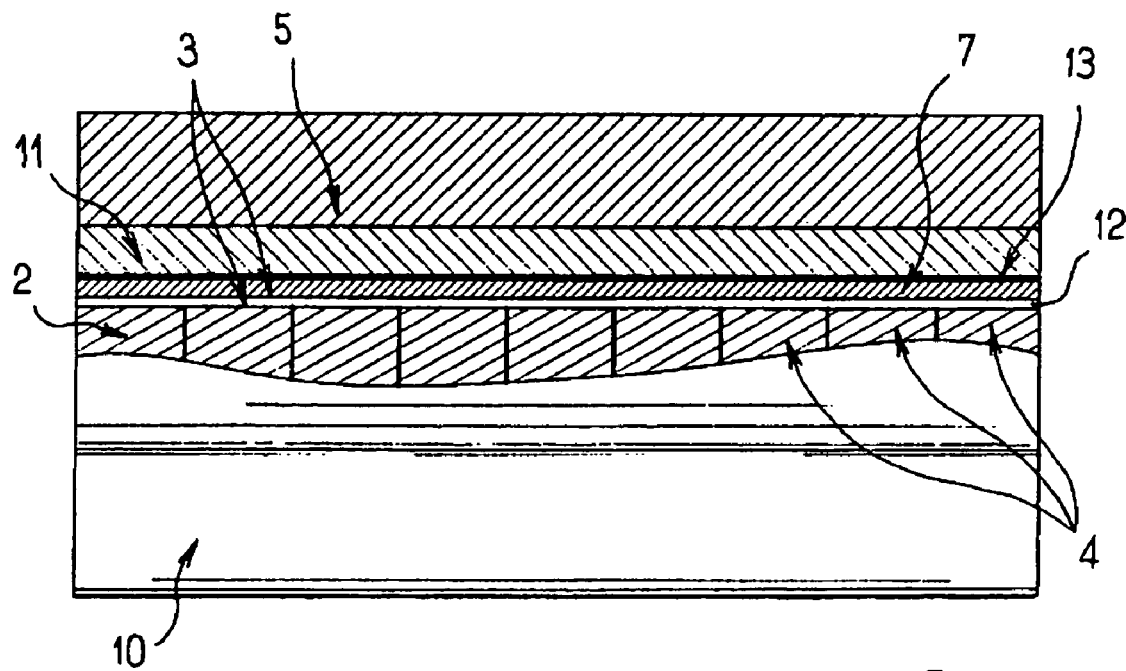
FIG._7

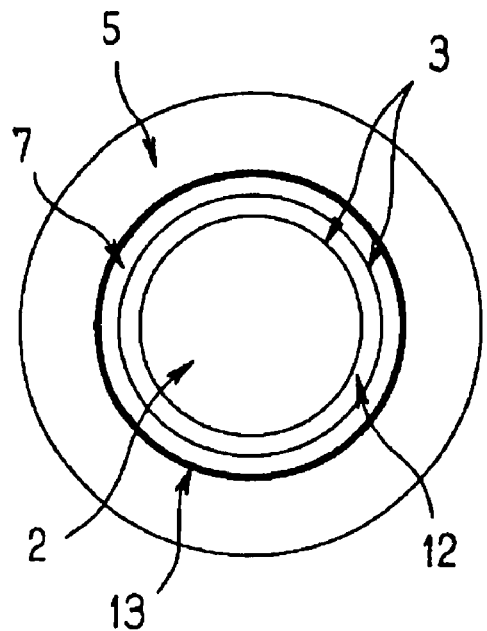
FIG_8
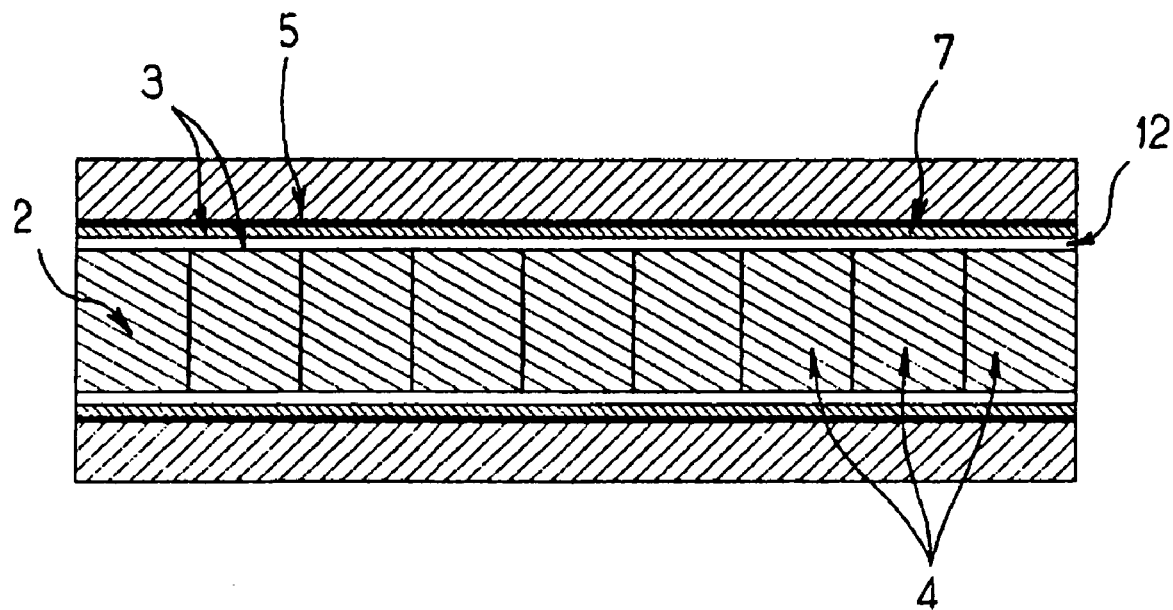
FIG_9

MATERIALS OF ACTIVE-PISTON ACTUATORS

GENERAL TECHNICAL AREA AND PRIOR ART

The invention concerns active-piston actuators, and in particular those with pistons in piezoelectric materials.

Such actuators are employed advantageously in brake or clutch devices, and in particular in motor vehicles or aircraft.

An actuator with a piston in piezoelectric materials has already been described in document FR 2 800 028.

As illustrated in FIG. 1, such an actuator includes a cylinder or a sliding sleeve 1 and a piston 2 designed to slide axially in the said cylinder 1.

The cylinder 1 is composed of several cylinders nested coaxially within each other, namely an outer cylinder 5, an inner cylinder 7 and an intermediate cylinder 6 which lies between the inner cylinder 7 and the outer cylinder 5, with the piston 2 sliding in the inner cylinder 7.

Cylinder 5 pre-stresses cylinder 7 and intermediate cylinder 6 by tightening onto them. This intermediate cylinder 6 includes radial slots 8, shown in FIG. 2, which extend from generating lines of the inner cylinder 7.

The piston 2 is composed of a multiplicity of piezoelectric ceramic sections 4. Each section is fitted with electrodes (not shown in FIGS. 1 and 2) which are used to control them independently of each other. Each section can be in multi-layer ceramic or in solid ceramic.

These electrodes are used to control the said sections, either to dilate them transversally so that they are locked by friction onto cylinder 7, or to lengthen them, with the sections being operated in an alternating sequence of locking and lengthening so as to either move the piston or, when it is blocked, to generate a force which can then be used as a braking force for example.

Layers forming friction pairs are provided on the faces of the piston 2 and of cylinder 7, in order to ensure optimal friction.

The electrical elongation of a monocrystal piezoelectric element is the order of 1.4%. That of a multi-layer element is 0.1%. As an example, for an element measuring 25 mm, the resulting electrical elongation for a multi-layer element is about 9 μm. However, the manufacture of the multi-layer elements is much less costly and their operation allows the use of much lower voltages. With a control frequency up to an order of magnitude of 40 kHz, one can expect the same speeds of piston movement as with a hydraulic actuator.

However because of the very small elongation of the piezoelectric elements, control of the play between the sliding sleeve and the active piston in piezoelectric materials is vital. In fact, the locking force of the piston 2 in the cylinder 1 depends mainly on four factors:

the friction coefficient between the two parts 1 and 2 covered by the friction pairs 3;
the electrical expansion of the piezoelectric material of the piston 2;
the increase in the play between the cylinder 1 and the piston 2 due to the wear on these two parts;
the variations in the value of the play between the cylinder 1 and the piston 2 as a function of the system temperature.

This last factor shows that control of the play in the range of temperatures of the applications of such actuators, ranging from −40° C. (−60° C. for aircraft) to 200° C. or 300° C. or even more, represents a considerable challenge. This control determines the functional characteristics as well as the price of the actuator.

The material making up the active piston has a thermal expansion coefficient with an atypical value. Consequently, it must be possible, using conventional materials, to design a mechanical part which has a thermal expansion coefficient that is compatible with that of the active material.

The actuator of document FR 2 800 028 proposes to control the value of this play in accordance with the variation of temperature by exploiting different values of the expansion coefficients of the cylinders 5, 6 and 7.

To this end, the material(s) of cylinders 5 and 7 are chosen with expansion coefficients which are low but nevertheless algebraically greater than that of the piston 2. The material of the intermediate cylinder 6 is chosen with an expansion coefficient which is greater than the coefficients of parts 5 and 7.

When the temperature increases, the active piston contracts slightly. The play between the sleeve and the piston increases. In order to compensate for this increase, cylinder 6 expands radially, but it is partially impeded by cylinder 5 which expands less than it does. As a consequence, the constrained outward expansion is transferred to cylinder 7 which finds itself compressed radially.

The expansion slots 8 prevent the formation of orthoradial stresses, which would prevent any expansion of cylinder 5 toward the interior, and the compression of cylinder 7.

The internal expansion coefficient of cylinder 7 is adjusted by acting on the thickness of cylinder 5. Control of the play between the cylinder 1 and the active piston 2 in accordance with the temperature is therefore effected by choosing the relative thicknesses of the different cylinders 5, 6 and 7.

These actuators have drawbacks however. Their design, that is the determination of the different relative thicknesses, is difficult. In fact, cylinder 1 is composed of three cylinders, whose thicknesses constitute so many more parameters to be included in the design. Moreover, their manufacture is costly and complicated, since there is no solid lubricant at the interfaces between the cylinders to facilitate their relative sliding action due to thermal expansion, and their assembly in particular.

Document FR 2 819 468 proposes an actuator in which control of the play between the sleeve and the piston as a function of temperature is simplified. FR 2 819 468 proposes an actuator with a cylinder made from a crystalline material with a negative thermal expansion coefficient. Thus, the actuator of FR 2 819 468 includes an outer cylinder in which the sliding cylinder is pre-stressed, with either the outer cylinder or the sliding cylinder being in a material with a negative or approximately zero thermal expansion coefficient, with the other cylinder having a positive thermal expansion coefficient.

The crystalline materials presented in FR 2 819 468 for one of the cylinders have a thermal expansion coefficient that is negative isotropic or close to zero. These are chosen from amongst the following materials:

a. $ZrW_2O_8$, in α and/or β phase,
b. $HfW_2O_8$,
c. $ZrV_2O_7$,
d. $YAlW_3O_{12}$,
e. $ZrP_{2-x}V_xO_7$, where $0 \leq x \leq 2$, and
f. $Sc_2(WO_4)_3$.

These actuators also have drawbacks however, since they are limited in their area of use in respect of pressure and temperature.

In fact, in all the cases of use of the actuator, the hydrostatic tensions (or mechanical tensions according to the Von Mises criterion, created by the pre-stressing of the tubes) on materials with a negative expansion coefficient must not exceed 200 MPa (which is 2,000 bar). This pressure limitation for these materials means that the phase of the material is stable, and a phase transition is therefore avoided. The phase transition would cancel out the thermal expansion properties of the materials. Now when under mechanical stress in a brake or clutch device, a level of 200 MPa is reached with ease.

Moreover, the working temperatures are also limited, again so as to avoid a phase transition of the materials used. Table 1 (below) groups together the temperature and pressure characteristics of the different materials mentioned in FR 2 819 468.

A rise in temperature above the stability temperatures of the negative thermal expansion coefficient presented in table 1 cannot be neglected in a brake or clutch application.

The actuators of FR 2 819 468 therefore have areas of temperature and pressure that are of limited use, and sometimes incompatible with uses in the actuators of brake or clutch devices.

TABLE 1

| Phase | Coefficient of expansion α [ppm/K] | Thermal stability area of the expansion [° C.] |
|---|---|---|
| α-$ZrW_2O_8$ | −8.8 | from −273 to +155 |
| β-$ZrW_2O_8$ | −4.9 | from +155 to +780 (decomposition) |
| $YAlW_3O_{12}$ | −5/−7 | <+1100 |
| $ZrV_2O_7$ | 0 | from +150 to +700 |
| $ZrP_{2-x}V_xO_7$ | −6/−11.5 | <+100 |
| $Sc_2(WO_4)_3$ | −2.2 | from +263 to +520 |

In addition, with a view to dimensioning of the parts (and in particular their radial thickness), a high absolute value of the negative thermal expansion coefficient is as important as thermal stability of the negative expansion. The materials of FR 2 819 468 sometimes do not have a negative thermal expansion coefficient with such a large absolute value.

Furthermore, another element of FR 2 819 468 is the use of a solid lubricant in order to ensure the axial sliding motion between the two cylinders making up the actuator, one cylinder having a negative thermal expansion coefficient in use, and the other cylinder having a positive thermal expansion.

The solid lubricants presented in FR 2 819 468 are chosen from
  hexagonal boron nitride,
  $MoS_2$,
  $WSe_2$,
  $WS_2$,
  graphite (carbon) interleaved with substances known to the man skilled in the art,
  non-interleaved graphite,
  tin sulphide (in its SnS, $SnS_2$, and $Sn_3S_4$ forms), and
  Cerium fluoride ($CeF_3$), or
  any mixture of these materials.

In a brake or clutch application, it turns out that in view of lengthy guarantees of avionic and/or automobile equipment, the action of water, humidity and steam on the solid lubricants becomes a new criterion to be included. Now the chalcogenides presented in FR 2 819 468, in particular the sulphides and the selenides, react with the water and lose their intrinsic lubricating character, which limits the use of the actuator.

PRESENTATION OF THE INVENTION

One objective of the invention is to propose an actuator that will eliminate at least one of the aforementioned drawbacks.

To this end, the invention proposes an actuator that has an inner sliding cylinder and an outer cylinder in which the said sliding cylinder is pre-stressed, with either the outer cylinder or the sliding cylinder being in a material with a negative thermal expansion coefficient or one that is approximately zero, with the other cylinder having a positive thermal expansion coefficient or one that is approximately zero, with the actuator also having a linear piston in an active material that has a multiplicity of sections capable of being controlled so as to be expanded in a manner that causes it to jam in the sliding cylinder and/or to be elongated within the sliding cylinder in such a manner that the piston moves axially in the sliding cylinder by dry friction, wherein the material of the cylinder with a negative or approximately zero thermal expansion coefficient is one of the following materials:
  γ-$ZrMo_2O_8$ in a cubic structure,
  $Zr_2WP_2O_{12}$,
  a silicious faujasite,
  $Lu_2(WO_4)_3$,
  $ZrW_2O_8$ in cubic phase, with nanograins whose size is approximately between 10 nm and 75 nm, or
  any possible combination of these materials.

The invention is advantageously completed by the following characteristics, taken alone or in their possible combinations:
  the cylinder in a material with a negative or approximately zero thermal expansion coefficient is the outer cylinder, the sliding cylinder being in a material with a positive expansion coefficient;
  there is at least one layer of solid lubricant at the interface between the outer cylinder and the sliding cylinder;
  the solid lubricant is fluoridated carbon $(CF_x)_n$, where x is a real number which represents the degree of fluoridation and n is an integer number which represents the degree of polymerisation;
  x is between 0.8 and 1.2, and preferably between 1.0 and
  The solid lubricant is:
  hexagonal boron nitride,
  $MoS_2$,
  $WSe_2$,
  $WS_2$,
  graphite, interleaved or non-interleaved,
  tin sulphide (in its SnS, $SnS_2$, $Sn_3S_4$ forms), and
  Cerium fluoride ($CeF_3$), or
  any mixture of these materials.
  the outer cylinder includes external outgrowths extending radially to the said cylinder;
  one of the two cylinders includes one or more slots, extending radially and longitudinally in the cylinder;
  the successive sections in active piezoelectric material are capable of being deformed independently of each other by control resources so as to shorten on themselves in a manner that causes it to jam in relation to the sliding cylinder or to lengthen in order to free itself in relation to the latter.

The invention has many advantages.

In particular, the actuator has better performance and longer life expectancy because of higher negative expansion coefficients and stability of the intrinsic lubricating character of the solid lubricant over greater temperature ranges and more humid working conditions (water or vapour).

The actuator can be used over broader and higher temperature and pressure ranges, for a greater length of time.

PRESENTATION OF THE FIGURES

Other characteristics and advantages of the invention will emerge from the description that follows, which is purely illustrative and non-limiting. It should be read with reference to the appended drawings, in which:

FIG. 1, already described, is a longitudinal section of one embodiment of the actuator according to FR 2 800 028;

FIG. 2, already described, is a cross section of one embodiment of the actuator according to FR 2 800 028;

FIG. 3 is a cross section of a first preferred embodiment of the actuator of the invention;

FIG. 4 is a longitudinal section of a first preferred embodiment according to the invention;

FIG. 6 is a representation in cross section of a second preferred embodiment of the actuator of the invention;

FIG. 7 is a longitudinal view that has a part in section of a second preferred embodiment of the actuator of the invention;

FIG. 8 is a representation of a cross section of a third embodiment of the actuator of the invention;

FIG. 9 is a longitudinal section of a third embodiment of the actuator of the invention.

Figure 1:
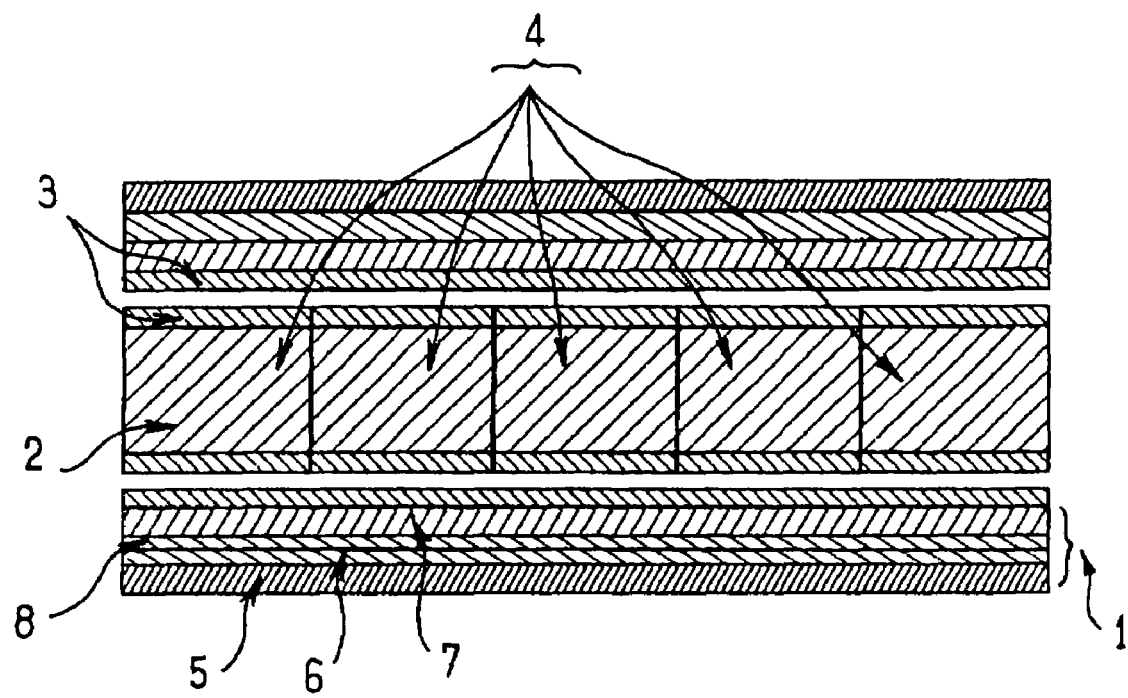
Figure 2:
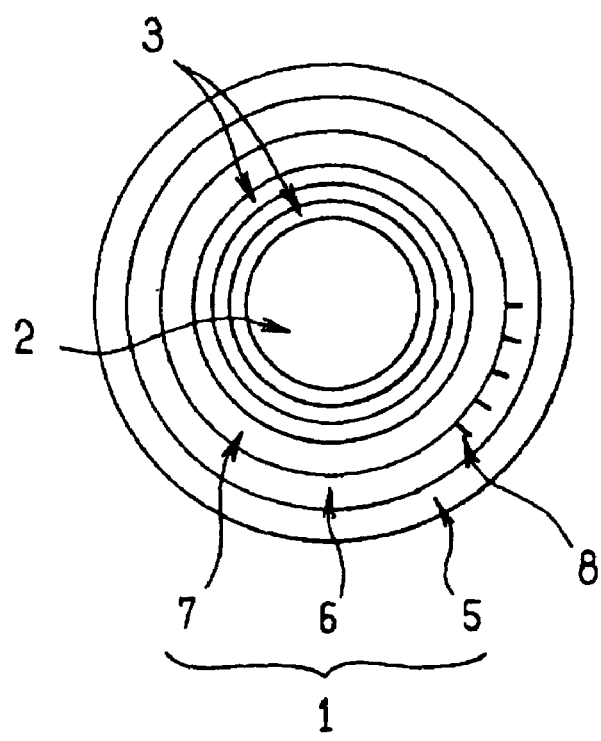

The general structure of the actuators according to the invention is similar to that of the actuator according to document FR 2 800 028. Three preferred embodiments are described below.

FIRST IMPLEMENTATION EXAMPLE

Description

The actuator which is shown in FIGS. 3 and 4 includes an outer cylinder 5, whose material has a positive thermal expansion coefficient, and an active piston 2 in a piezoelectric material, sliding in an inner sliding cylinder 7. Cylinder 7 is inserted forcibly into cylinder 5. It is therefore subject to pre-stressing, which holds it solidly in its support cylinder 5.

The inside diameter of cylinder 7 is 25 mm for example, and the outside diameter of cylinder 5 is 60 mm for example. The length of cylinders 5 and 7 is equal to the travel of the piston that the user wishes to see increased by the length of the piston.

The thermal expansion coefficient of the active piston is negative and low. It is of the order of −2 ppm/K. The length of the active piston 2 is 50 mm for example.

The inner cylinder 7 is in a material with a negative thermal expansion coefficient. We are familiar with materials which have low or negative thermal expansion coefficients (between −8 ppm/K and ≈0 ppm/K) from documents U.S. Pat. No. 5,514,360 and U.S. Pat. No. 5,919,720, for example.

The negative expansion materials of cylinder 7 are preferably chosen from the following:

γ-$ZrMo_2O_8$ in cubic structure,
$Zr_2WP_2O_{12}$,
a silicious faujasite,
$Lu_2(WO_4)_3$,
$ZrW_2O_8$ in cubic phase, that has nanograins whose size i is approximately between 10 nm and 75 nm, or
any possible combination of these materials, though this list of materials is by no means exhaustive.

The γ-$ZrMo_2O_8$ in cubic structure has a negative and isotropic thermal expansion coefficient of −5.5 ppm/K up to 330° C. For a long-term application, no instability of the $ZrMo_2O_8$ in cubic structure is observed below 280° C.

The $Zr_2WP_2O_{12}$ has a thermal expansion coefficient of −3.0 ppm/K up to 180° C.

By a silicious faujasite is meant a mineral (silicate) component of the cubic crystalline system of the zeolites group. The faujasites have a negative and isotropic thermal expansion coefficient of −4.2 ppm/K up to 300° C.

The scalar of the three crystallographic axes for the $Lu_2(WO_4)_3$ gives a mean thermal expansion of −6.8 ppm/K up to 627° C./1,100° C.

As illustrated in FIGS. 3 and 4, the piston 2 and the inner cylinder 7 are separated by a play gap 12.

Friction pairs 3 between the piston 2 and the inner cylinder 7 either fully or partially cover cylinder 7 and the piston 2, and generate a high friction force between these two elements. Such pairs are familiar to the man skilled in the art and are not described in any greater detail in the remainder of this present description.

FIG. 4 shows that, in the same manner as that described in document FR 2 800 028, the piston 2 includes a multiplicity of sections 4. The sections 4 of the piston 2 are, for example, multi-layer cylinders or disks measuring 25 mm in diameter and with a thickness of some 15 to 20 mm. Preferably, the active piston has three sections. Control voltages, applied to electrodes (not shown in FIGS. 3 and 4) fitted to the sections, are used to expand radially or to lengthen the said piezoelectric sections.

The friction force generated by the friction pairs 3 allows certain sections to jam against cylinder 7 when they are expanded radially, and others to lengthen in cylinder 7, bearing upon a jammed section so as to generate a force which can then operate the brake device for example.

In the preferred embodiment shown in FIGS. 3 and 4, the interface between the inside cylinder 7 and the outer cylinder 5 has a solid lubricating layer 13.

In a variant of this embodiment according to the invention, the solid lubricant is present in the material(s) of the inside 7 and/or outside 5 cylinder(s).

Advantageously, this solid lubricant is:
hexagonal boron nitride,
$MoS_2$,
$WSe_2$,
$WS_2$,
graphite (carbon) interleaved with substances known to the man skilled in the art,
graphite not interleaved,
tin sulphide (in its SnS, $SnS_2$, $Sn_3S_4$ forms), and
Cerium fluoride ($CeF_3$), or
any mixture of these materials, this list being by no means exhaustive.

Very preferably, the solid lubricant is fluoridated carbon $(CF_x)_n$, where x is a real number which represents the degree of fluoridation, and n is an integer number which represents the degree of polymerisation. The fluoridated carbon is also sometimes called carbon polymonofluoride. Preferably, the fluoridated carbon, $CF_x$, where x is between 0.8 and 1.2 (CAS number 51311-17-2, has a lamellar hexagonal structure. The intrinsic lubricating character becomes maximum for an x of approximately 1.0 to 1.1. With a wetting angle Θ of about 143°, the $CF_x$, does not wet the water. It has no hydrolytic reaction with the water. Depending on the degree of fluoridation x, the thermal stability of the $CF_x$ is in the temperature range between 380° C. and 630° C.

Figure 5:
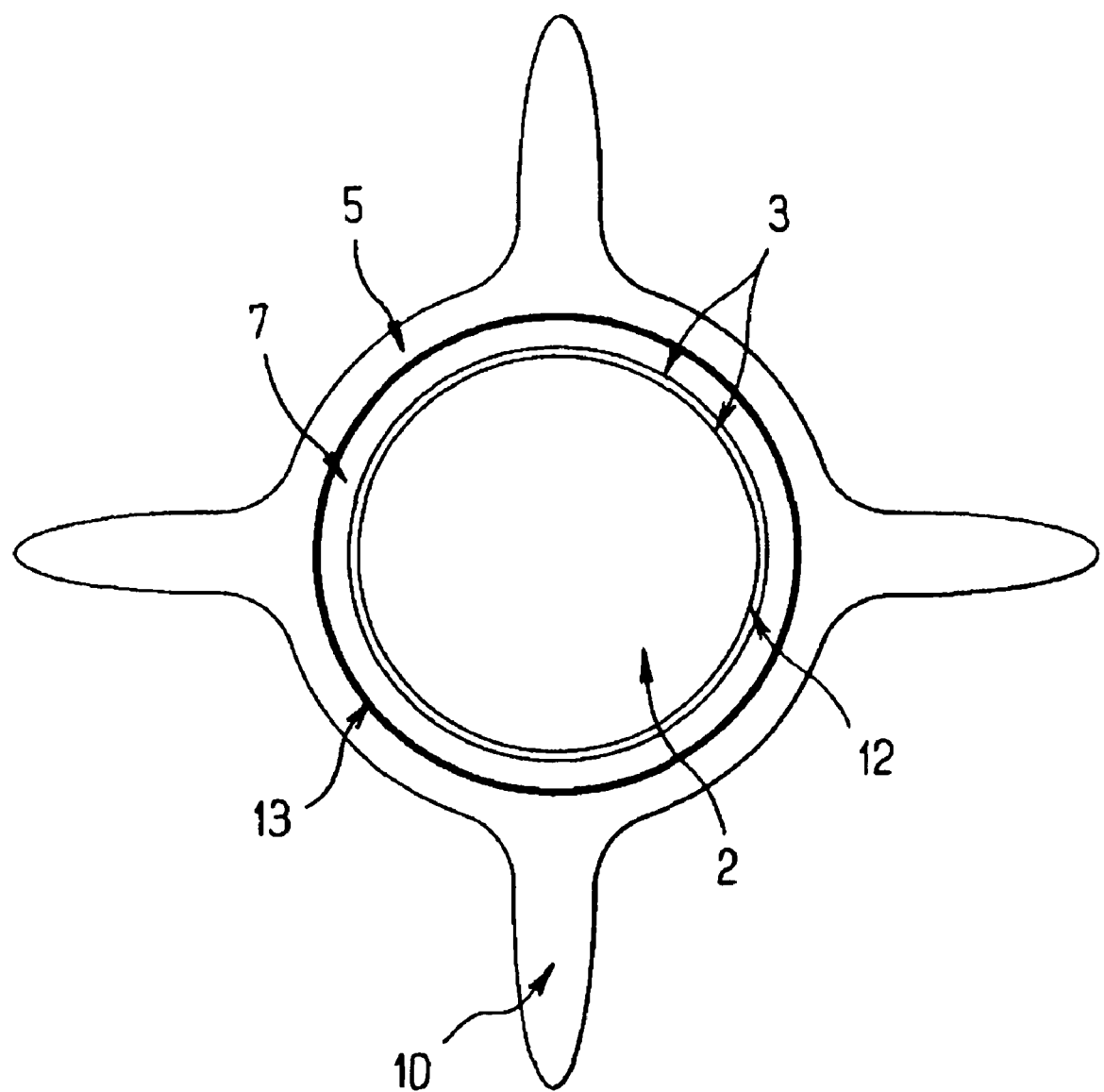
FIG. 5 is a cross section of a variant of a first embodiment of the actuator of the invention.

In the preferred embodiment shown in FIGS. 3 and 4, the outer cylinder is of circular form. However, in a variant of this embodiment, illustrated in FIG. 5, the outer cylinder 5 can have support and stiffness resources 10 in the form of one or more outgrowths of material extending radially to cylinder 5. These outgrowths 10 of material are preferably of oblong shape.

Cylinder 5 improves performance in respect of tenacity and resistance to bending of the inner cylinder 7—outer cylinder 5 assembly.

As mentioned, the inner cylinder 7 is mounted by force in the outer cylinder 5. This pre-stressing gives rise to an elastic deformation of the inner cylinder 7. Cylinder 7 is elastically retracted at ambient temperature.

Principle of Operation

At rest or at low temperature, the piston 2 and the inner cylinder 7 are separated by a play gap 12 which is determined for correct operation of the actuator, and typically 2 to 3 µm.

The temperature of the actuator increases, in particular with the temperature of its environment. The active piezoelectric piston 2 then contracts as a function of its negative expansion coefficient—approximately −2 ppm/K.

Since the inner cylinder 7 has a negative thermal expansion coefficient which is approximately greater in absolute value (of the order of −8 ppm/K), it also contracts, but to a lesser extent. Consequently, mounted alone, it would reduce to zero the play between the piston 2 and itself, and would jam the actuator.

The outer cylinder 5 will allow this excessive contraction to be compensated for and will prevent the inner cylinder 7 from jamming the active piston 2.

The inner cylinder 7 is elastically contracted by the pre-stressing exerted by the outer cylinder 5, which itself has an expansion coefficient which is positive or close to zero, like invar alloy for example. By a thermal expansion coefficient that is approximately equal to zero is meant a coefficient whose value is lower, in absolute value, than 2 ppm/K.

When the outer cylinder 5 expands during the operation of the actuator, it progressively releases the pre-stress that it had been applying to the inner cylinder 7. The inner cylinder 7, which firstly contracts because of its negative thermal expansion coefficient, then expands because of the release of the pre-stress exerted by the outer cylinder 5.

The two effects compensate each other sufficiently so that the initial play gap 12 remains constant throughout the operation of the actuator.

A numerical example is given below.

If we describe as $K_7$ the stiffness of the inner cylinder 7 which determines the ratio between the outside stress, measured positively from the outer cylinder 5 to the inner cylinder 7, and a variation $\Delta r_7$ of the radius $r_7$ of the inner cylinder 7, we can describe the compression stress $\sigma_7$ as:

$$\sigma_7 = \sigma_0 + K_7 \Delta r_7$$

where $\sigma_0$ is the pre-stress for $\Delta r = 0$.

Likewise, for the outer cylinder 5, the compression stress $\sigma_5$, measured positively from the inner cylinder 7 to the outer cylinder 5, can be written as:

$$\sigma_5 = \sigma_0 - K_5 \Delta r_5,$$

The minus sign shows that the stress borne by the outer cylinder 5 reduces when the interface between cylinders 5 and 7 moves toward the inner cylinder 7.

In a first approximation, the interface between the two cylinders moves radially in accordance with the temperature of distance d, where:

$$d = \alpha_p \Delta \vartheta$$

where $\alpha_p$ is equal to the expansion coefficient of the piezoelectric material and $\Delta \vartheta$ is equal to the temperature variation.

We thus have:

$$\Delta r_7 = (\alpha_7 - \alpha_p) \Delta \vartheta$$

$$\Delta r_5 = (\alpha_5 - \alpha_p) \Delta \vartheta$$

where $\alpha_7$ and $\alpha_5$ are the thermal expansion coefficients of the inner cylinder 7 and the outer cylinder 5 respectively.

The inner cylinder 7—outer cylinder 5 system is in balance. Consequently, we have:

$$\sigma_7 = \sigma_5$$

which, if $\sigma_7$ and $\sigma_5$, still remain positive, meaning that the initial pre-stress $\sigma_0$ is sufficient, gives:

$$\sigma_0 + K_7(\alpha_7 - \alpha_p)\Delta\vartheta = \sigma_0 \cdot K_5(\alpha_5 - \alpha_p)\Delta\vartheta.$$

We thus get the following E relation:

$$\{E\} K_7(\alpha_7 - \alpha_p) + K_5(\alpha_5 - \alpha_p) = 0$$

Furthermore, the stiffness K of the assembly of the two pressed cylinders is:

$$K = K_7 + K_5$$

In the design of the actuator, we seek to maximise K. In fact, the active piston has to bear against something rigid, in order to be able to function correctly.

The materials with a positive expansion coefficient have greater stiffness than the materials with negative thermal expansion coefficients. This is the case in particular of the materials derived from steel for example, which have a very high degree of rigidity.

In the above example, $\alpha_7$ is negative, $\alpha_5$ is positive, and $K_7 \leq K_5$.

We will choose materials with low thermal expansion coefficients ($\alpha_7$ and $\alpha_5$, close to $\alpha_p$) in order to be able to choose stiffnesses $K_5$ and $K_7$ that are as high as possible so as to stiffen the assembly of the two cylinders, but in such a manner that the relation E is still true.

We can thus advantageously use invar, which has a positive and low thermal expansion coefficient (of the order of 1 ppm/K), and high stiffness, since it is of metal composition.

Furthermore, the E relation, and also the $\sigma = E \epsilon$ relation, relating Young's Modulus E, the elastic deformation $\epsilon$, and the stress $\sigma$, in the material, allow the man skilled in the art to determine the initial pre-stress $\sigma_0$ to be applied to the cylinders, the elastic deformations due to the stresses, and the deformations due to the temperature changes.

In all of these cases, the stresses on the material with negative thermal expansion coefficient, which must not exceed 200 MPa so that the phase of the material should be stable in the actuator of FR 2 819 468, can now reach 600 MPa approximately. The area of use of the actuator is therefore broadened in relation to the previous designs.

If the material with the positive expansion coefficient is on the outside, the pre-stress is released progressively when the temperature increases. It is therefore necessary that this maximum pre-stress should be exerted at the minimum temperature (−40° C. or −60° C., for example).

The pre-stress is maximum at −40° C. or −60° C., and at 200° C. this pre-stress will be approximately zero. This is why cylinder 5 can be advantageously mounted with a low pre-stress at +200° C.

Due to compensation of the thermal contraction of cylinder 7 by its elastic expansion due to the thermal expansion of cylinder 5, the value of the play gap 12 between the active piston 2 and the inner cylinder 7 therefore remains virtually unchanged regardless of the surrounding temperature.

The expansion of cylinder 5 and the simultaneous contraction of cylinder 7 generates a relative slippage of the two parts. The presence of the layer of solid lubricant 13—the materials have already been mentioned above), at the interface between these two parts, facilitates this slippage. This layer of lubricant has a thickness of 0.1 µm to 5 µm, but preferably is between 0.3 µm and 1 µm. The presence of this layer also facilitates the forcible mounting of cylinder 7 in cylinder 5.

Another embodiment has it that this lubricant 13 is contained in the material of the outer cylinder 5 and/or in the material of the inner cylinder 7.

This control of the play gap is achieved more simply than in the previous designs described in document FR 2 800 028, since the number of parts for which it is necessary to control the expansion is lower. Moreover, in this first preferred embodiment, the cylinders do not have expansion slots as in the actuator of document FR 2 800 028.

The parts are therefore less affected by the stresses, since these are applied only to the interface of parts 5 and 7.

Finally, the relative sliding of the parts is facilitated by the presence of the solid lubricant 13, unlike the actuators described in previous designs.

Consequently, for all of these reasons, the life expectancy and the safety/security of the actuator are improved and or extended.

SECOND IMPLEMENTATION EXAMPLE

Description

A second embodiment, whose structure is similar to that of the first implementation method, is shown in cross section in FIG. 6, and in longitudinal section in FIG. 7. The numbers of the parts in these figures are similar to those in FIGS. 3, 4 and 5, in order to convey the similarity of the components of the second embodiment.

The materials of the cylinder with a negative expansion coefficient are the same as for the first embodiment, and the solid lubricant is also the same as for the first embodiment.

In FIGS. 6 and 7, cylinder 5 had support and stiffness resources 10 in the form of one or more outgrowths of material extending radially to cylinder 5. However, we can consider a cylinder 5 of circular form in the developments that follow, while still remaining true to the actuator of the invention.

In this second embodiment, cylinder 5 has one or more expansion slots 11. These slots 11 are radial and extend from generating lines of the inner cylinder 7. Each slot 11 extends in radial and longitudinal directions, in the low thickness parts of cylinder 5 and/or preferably in the outgrowths 10. The longitudinal extension takes place preferably over the length of the cylinder.

Principle of Operation

The principle of operation of this second embodiment is similar to that of the first embodiment described previously. This second embodiment will be preferred in the case where the outer cylinder 5 is constructed in a material which has small elastic deformations. The slots 11 will therefore increase the increase the ability to elongate cylinder 5.

It should be noted however that this second embodiment will be preferred only in the event of problems with the elongation of cylinder 5 since the slots 11 reduce the stiffness K of the inner cylinder 7—outer cylinder 5 system.

During the operation of the actuator or the rise in temperature, the outer cylinder 5, with a positive thermal expansion coefficient, will expand. At the same time as it tends to expand radially in order to compensate for the contraction of cylinder 7, as in the first embodiment, it expands circumferentially and tightens on the expansion slot 11, which has the effect of limiting its radial expansion.

THIRD IMPLEMENTATION EXAMPLE

Description

The third embodiment, shown in FIGS. 8 and 9, has the same structure as the first embodiment of FIGS. 3 and 4, and a similar numbering of the components reflects this similarity.

The great difference is that the outer cylinder 5' is in a material with a negative thermal expansion coefficient, and that the inner cylinder 7' has a positive thermal expansion coefficient or one that is close to zero (less than 2 ppm/K in absolute value, for example).

However, the materials of the cylinder that have a negative expansion coefficient are the same as those of the first embodiment, and the solid lubricant is also the same as for the first embodiment.

The active piston in piezoelectric materials 2 and the inner cylinder 7 are separated by a play gap 12. The friction pairs 3, which are familiar to the man skilled in the art, either fully or partially cover cylinder 7 and the piston 2, and a high friction force generate between these two elements.

FIG. 9 shows that, in the same manner as in the document FR 2 800 028, the piston 2 includes a multiplicity of sections 4. The sections 4 of the piston 2 are likewise multi-layer cylinders or disks with a diameter of 25 mm and a thickness of 15 to 20 mm.

A layer of solid lubricant is present at the interface between the outer cylinder 5' and the inner cylinder 7'.

In an other embodiment, this solid lubricant can be included in the material(s) of cylinders 5' and/or 7'.

In this embodiment, we determine a relation E' as follows:

$$\{E'\}K_{7'}(\alpha_{7'}-\alpha_p)+K_{5'}(\alpha_{5'}-\alpha_p)=0$$

where $\alpha_{7'}$, $\alpha_{5'}$ and $K_{7'}$, $K_{5'}$ are the thermal expansion coefficients and the stiffnesses of the inner cylinder 7' and the outer cylinder 5' respectively. In this case then:

$\alpha_{7'}$ is positive, $\alpha_{5'}$ is negative, and $K_{7'} \geq K_{5'}$.

Principle of Operation

At low temperature, the piston 2 and cylinder 5' are separated by the play gap 12. During the operation of the actuator, and when the surrounding temperature or that of the surrounding parts increases, the piston 2 contracts.

Simultaneously, the inner cylinder 7' tends to expand. The value of the play gap 12 therefore tends to increase.

As in the previous embodiments, the outer cylinder 5' will compensate for this effect in order to maintain the value of the play gap 12 approximately constant and to ensure correct operation of the actuator.

The outer cylinder 5' has a negative thermal expansion coefficient. Consequently, it will contract and prevent cylinder 7' from expanding. As cylinder 7' can no longer expand, the play gap 12 remains constant.

The stress at the interface between cylinder 5' and cylinder 7' increases while the inner cylinder 7' attempts to expand and the outer cylinder 5' prevents it from contracting.

This embodiment will be employed with cylinders of materials with a negative expansion coefficient which can tolerate high voltages being applied to their internal diameters. This is not the case of all the materials with a negative expansion coefficient. In the case where the material with a negative expansion coefficient has a resistance to these excessively low voltages, the first and second implementation methods will be preferred.

In all cases, the stresses on the material with negative thermal expansion coefficient, which must not exceed 200 MPa so that the phase of the material should be stable in the actuator of FR 2 819 468, can now reach some 600 MPa. The area of use of the actuator is therefore broadened in relation to the previous designs.

Moreover, as for the previous embodiments, the man skilled in the art can design variants to this preferred embodiment without moving outside the scope of the invention.

These variants are, for example, the presence of support and stiffness resources on the form of external outgrowths on the outer cylinder 5'. The presence of expansion slots in the inner cylinder 7' or retractions in cylinder 5', as well as the dimensioning of their depths, are used to resolve the problems of insufficient elongation, as would be presented in the third embodiment of FIGS. 8 and 9.

The term cylinder, used in all of the aforementioned developments must be interpreted in the broad sense. In general, it refers to any form defined by a set of parallel generating lines bearing onto a given closed surface.

The actuators which have just been described are advantageously used to equip brake callipers, and more particularly the brake callipers of aircraft or motor vehicles, clutch systems, or the actuators of control surfaces.

The invention claimed is:

1. An actuator comprising an inner sliding cylinder and an outer cylinder in which the said sliding cylinder is prestressed, with either the outer cylinder or the sliding cylinder being in a material with a negative or approximately zero thermal expansion coefficient, with the other cylinder having a positive thermal expansion coefficient or one that is approximately zero, where the actuator also includes a linear piston in an active material, with a multiplicity of sections capable of being controlled so as to be expanded in a manner that causes it to jam in the sliding cylinder and/or to be elongated within the sliding cylinder in such a manner that the piston moves by dry friction axially in the sliding cylinder, wherein the material of the cylinder with a negative or approximately zero thermal expansion coefficient is one of the following materials:

γ-$ZrMo_2O_8$ in cubic structure,
$Zr_2WP_2O_{12}$,
a silicious faujasite,
$Lu_2(WO_4)_3$,
$ZrW_2O_8$ in cubic phase, that has nanograins whose size is approximately between 10 nm and 75 nm, or
any possible combination of these materials.

2. An actuator according to claim 1, wherein the cylinder in a material with a negative or approximately zero thermal expansion coefficient is the sliding cylinder, the outer cylinder being in a material with a positive expansion coefficient.

3. An actuator according to claim 1, wherein the cylinder in a material with a negative or approximately zero thermal expansion coefficient is the outer cylinder, with the sliding cylinder being in a material with a positive expansion coefficient.

4. An actuator according to claim 1, including at least one layer of solid lubricant at the interface between the outer cylinder and the sliding cylinder.

5. An actuator according to claim 4, wherein the solid lubricant is fluoridated carbon $(CF_x)_n$ where x is a real number which represents the degree of fluoridation and n is a integer number which represents the degree of polymerisation.

6. An actuator according to claim 5, wherein x is between 0.8 and 1.2, and preferably between 1.0 and 1.1.

7. An actuator according to claim 4, wherein the solid lubricant is:
hexagonal boron nitride,
$MoS_2$,
$WSe_2$,
$WS_2$,
graphite, interleaved or not interleaved,
tin sulphide (in its SnS, $SnS_2$, $Sn_3S_4$ forms), and
Cerium fluoride ($CeF_3$), or
any mixture of these materials.

8. An actuator according to claim 1, wherein the outer cylinder includes external outgrowths extending radially to the said cylinder.

9. An actuator according to claim 1, wherein one of the two cylinders includes one or more slots, extending radially and longitudinally in the cylinder.

10. An actuator according to claim 1, wherein the successive sections in active piezoelectric material are capable of being deformed independently of each other by control resources, so as to shorten on themselves in a manner that causes it to jam in relation to the sliding cylinder or to lengthen in order to free itself in relation to the latter.

* * * * *